(12) United States Patent
Jiang et al.

(10) Patent No.: US 12,243,563 B2
(45) Date of Patent: Mar. 4, 2025

(54) VOICE-CONTROLLED CONTENT CREATION

(71) Applicant: Lemon Inc., Grand Cayman (KY)

(72) Inventors: Wenqing Jiang, Los Angeles, CA (US); Serhan Uslubas, Los Angeles, CA (US); Zheng Li, Culver City, CA (US); Ming Tu, Los Angeles, CA (US); Shiva Shanker Pandiri, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/838,022

(22) Filed: Jun. 10, 2022

(65) Prior Publication Data

US 2023/0402068 A1 Dec. 14, 2023

(51) Int. Cl.

| | | |
|---|---|---|
| G11B 27/34 | (2006.01) | |
| G06F 3/16 | (2006.01) | |
| G10L 15/04 | (2013.01) | |
| G10L 15/22 | (2006.01) | |
| G10L 25/57 | (2013.01) | |
| G11B 27/031 | (2006.01) | |
| G11B 27/036 | (2006.01) | |
| H04N 5/76 | (2006.01) | |
| H04N 23/60 | (2023.01) | |
| H04N 23/62 | (2023.01) | |
| H04N 23/63 | (2023.01) | |

(52) U.S. Cl.
CPC .............. *G11B 27/34* (2013.01); *G10L 15/04* (2013.01); *G10L 15/22* (2013.01); *G10L 25/57* (2013.01); *G11B 27/036* (2013.01); *H04N 5/76* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,223,136 | B1 * | 12/2015 | Braun | G06F 3/167 |
| 9,609,230 | B1 * | 3/2017 | Bakshi | H04N 23/56 |
| 2003/0133022 | A1 * | 7/2003 | Melton | G11B 27/034 |
| | | | | 386/E5.067 |

(Continued)

FOREIGN PATENT DOCUMENTS

| | | |
|---|---|---|
| CN | 103561305 A | 2/2014 |
| CN | 113805700 A | 12/2021 |
| JP | 2001-203974 A | 7/2001 |

OTHER PUBLICATIONS

International Patent Application No. PCT/SG2023/050396; Int'l Search Report; dated Oct. 17, 2023; 4 pages.

*Primary Examiner* — Hung Q Dang

(74) *Attorney, Agent, or Firm* — BakerHostetler

(57) ABSTRACT

The present disclosure describes techniques for voice-controlled content creation. The techniques comprise monitoring voice commands spoken by a creator. Recording of a content may be initiated in response to recognizing a first voice command spoken by the creator. Recording of the content may be stopped in response to recognizing a second voice command spoken by the creator. A timestamp associated with the second voice command may be created. A segment may be automatically deleted from the content based on the timestamp. The segment may comprise a recording of the second voice command.

18 Claims, 14 Drawing Sheets

(56) References Cited

U.S. PATENT DOCUMENTS

| | | | |
|---|---|---|---|
| 2008/0036869 A1* | 2/2008 | Gustafsson | H04N 23/66 348/222.1 |
| 2015/0365725 A1* | 12/2015 | Belyaev | H04N 21/6175 725/46 |
| 2016/0189717 A1* | 6/2016 | Kannan | G10L 15/22 704/275 |
| 2017/0109122 A1* | 4/2017 | Schmidt | H04L 65/75 |
| 2021/0029804 A1* | 1/2021 | Chang | H05B 47/12 |
| 2021/0289123 A1 | 9/2021 | Ueda | |
| 2022/0020396 A1* | 1/2022 | Khan | G11B 27/3036 |
| 2022/0286757 A1* | 9/2022 | Woo | H04N 21/8106 |

* cited by examiner

VOICE-CONTROLLED CONTENT CREATION

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for entertainment, social networking, and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Users of content creation platforms may create content that include "start" and/or "stop" operational segments. For example, a user of a content creation platform may create a video that shows the user starting and/or stopping the camera recording, as the only way to start and/or stop the camera recording may be via button-selection or touch-screen operations. However, such segments do not add much, if any, meaning to the content. Additionally, such segments may contribute to the unprofessional appearance of published content, and/or such segments may increase the content data size—leading to increased server uploading delays.

To address the downsides to including these segments in the published content, the segments may be cut out before the content is published. However, cutting out these segments in this manner may involve extra content editing steps. Additionally, there may be a content quality drop due to the re-encoding process after editing.

Thus, improvements in content creation techniques are desirable. In particular, techniques for voice-controlled content creation are desirable. Described here are techniques that enable voice-controlled creation of content, such as videos. Voice commands spoken by a content creator may be monitored. Recording of a content, such as a video, may be initiated in response to recognizing a first voice command spoken by the creator. Recording of the content may be stopped in response to recognizing a second voice command spoken by the creator. A timestamp associated with the second voice command may be created. A segment may be deleted from the content based on the timestamp. The deleted segment may comprise a recording of the second voice command.

Figure 1:
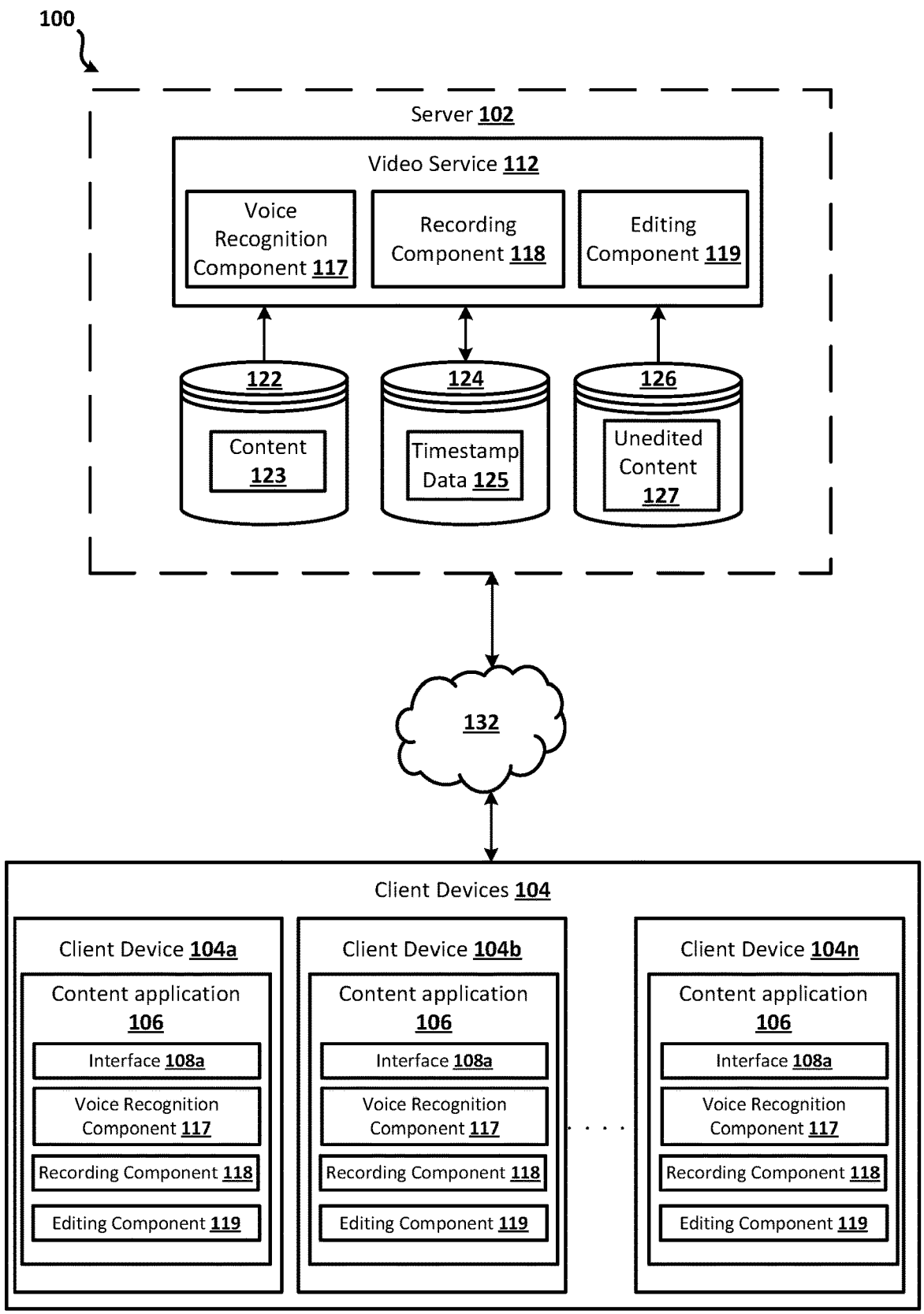
FIG. 1 shows an example system for distributing content which may be in accordance with the present disclosure.

The techniques for voice-controlled content creation described herein may be utilized by a system for distributing content. FIG. 1 illustrates an example system 100 for distributing content. The system 100 may comprise a server 102 and a plurality of client devices 104. The server 102 and the plurality of client devices 104a-n may communicate with each other via one or more networks 132.

The server 102 may be located at a data center, such as a single premise, or be distributed throughout different geographic locations (e.g., at several premises). The server 102 may provide the services via the one or more networks 120. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The server 102 may comprise a plurality of computing nodes that host a variety of services. In an embodiment, the nodes host a video service 112. The video service 112 may comprise a content streaming service, such as an Internet protocol video streaming service. The video service 112 may be configured to distribute content 123 via a variety of transmission techniques. The video service 112 is configured to provide the content 123, such as video, audio, textual data, a combination thereof, and/or the like. The content 123 may comprise content streams (e.g., video stream, audio stream, information stream), content files (e.g., video file, audio file, text file), and/or other data. The content 123 may be stored in a database 122. For example, the video service 112 may comprise a video sharing service, a video hosting platform, a content distribution platform, a collaborative gaming platform, and/or the like.

In an embodiment, the content 123 distributed or provided by the video service 112 comprises videos. The videos may have a duration less than or equal to a predetermined time limit, such as one minute, five minutes, or other predetermined minutes. By way of example and without limitation, the videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other videos may not comprise a pre-recorded audio overlay. For example, these videos may feature an individual playing sports, pulling pranks, or giving advice, such as beauty and fashion advice, cooking tips, or home renovation tips.

In an embodiment, the content 123 may be output to different client devices 104 via the network 132. The content 123 may be streamed to the client devices 104. The content stream may be a stream of videos received from the video service 112. The plurality of client devices 104 may be configured to access the content 123 from the video service 112. In an embodiment, a client device 104 may comprise a content application 106. The content application 106 outputs (e.g., display, render, present) the content 123 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the server 102. The plurality of client devices 104 may travel to a variety of locations and use different networks to access the server 102.

The video service 112 may be configured to receive input from users. The users may be registered as users of the video service 112 and may be users of the content application 106 operating on client devices 104. The user inputs may include videos created by users, user comments associated with videos, or "likes" associated with videos. The user inputs may include connection requests and user input data, such as text data, digital image data, or user content. The connection requests may comprise requests from the client devices 104a-d to connect to the video service 112. The user input data may include information, such as videos and/or user comments, that the users connected to the video service 112 want to share with other connected users of the video service 112.

The video service 112 may be able to receive different types of input from users using different types of client devices 104. For example, a user using the content application 106 on a first user device, such as a mobile phone or tablet, may be able to create and upload videos using the content application 106. A user using the content application 106 on a different mobile phone or tablet may also be able to view, comment on, or "like" videos or comments written by other users. In another example, a user using the content application 106 on a smart television, laptop, desktop, or gaming device may not be able to create and upload videos or comment on videos using the content application 106. Instead, the user using the content application 106 on a smart television, laptop, desktop, or gaming device may only be able to use the content application 106 to view videos, view comments left by other users, and "like" videos.

In an embodiment, a user may use the content application 106 on a client device 104 to create a video, such as a short video, and upload the video to the server 102. The client devices 104 may access an interface 108 of the content application 106. The interface 108 may comprise an input element. For example, the input element may be configured to allow users to create the video. To create the short video, the user may give the content application 106 permission to access an image capture device, such as a camera, or a microphone of the client device 104. Using the content application 106, the user may select a duration for the video or set a speed for the video, such as "slow-motion" or "speed things up."

The user may edit the video using the content application 106. The user may add one or more texts, filters, sounds, or effects, such as beauty effects, to the video. To add a pre-recorded audio overlay to the video, the user may select a song or sound clip from a sound library of the content application 106. The sound library may include different songs, sound effects, or audio clips from movies, albums, and television shows. In addition to or in lieu of adding a pre-recorded audio overlay to the video, the user may use the content application 106 to add a voice-over to the video. The voice-over may be a sound recorded by the user using a microphone of the client device 104. The user can add a text overlay to the short video and may use the content application 106 to specify when they want the text overlay to appear in the video. The user may assign a caption, location tag, and one or more hashtags to the video to indicate the subject matter of the video. The content application 106 may prompt the user to select a frame of the video to use as a "cover image" for the video.

After the user has created the video, the user may use the content application 106 to upload the video to the server 102 and/or to save the video locally to the user device 104. When a user uploads the video to the server 102, they may choose whether they want the video to be viewable by all other users of the content application 106 or viewable by only a subset of the users of the content application 106. The video service 112 may store the uploaded videos and any metadata associated with the videos in one or more databases 122.

In an embodiment, a user may use the content application 106 on a client device 104 to provide input on a video. The client devices 104 may access an interface 108 of the content application 106 that allows users to provide input associated with videos. The interface 106 may comprise an input element. For example, the input element may be configured to receive input from a user, such as comments or "likes" associated with a particular video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The video service 112 may store the input and associated metadata in a database 122.

The video service 112 may be configured to output the uploaded videos and user input to other users. The users may be registered as users of the video service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

In embodiments, a user may use the content application 106 on a client device 104 to create a video, such as a short video, using voice control, and upload the video to the server 102. In this manner, users of the video service 112 can perform "hands-free" video recording. Instead of the user needing to press a record button, walk away from the client device 104, capture the video, walk back to the client device 104, and press a stop recording button, the user can control the video creation using voice control. For example, the user can instruct the content application 106 to begin recording the video after the user has already walked away from the client device 104. Likewise, the user can instruct the content application 106 to pause and/or end recording of the video without the user needing to walk back to the client device 104. To create the video using voice control, the user may give the content application 106 permission to access an image capture device, such as a camera, and a microphone of the client device 104.

In embodiments, the video service 112 and/or the content application 106 comprises a voice recognition component 117. The voice recognition component 117 may be configured to listen for or monitor keywords associated with video creation. For example, the voice recognition component 117 may be configured to listen for or monitor voice commands spoken by a content creator (i.e., a user of the video service 112). The voice recognition component 117 may be initiated in response to a user indicating that the user wants to create content, such as a video. For example, a user may select a button on an interface 108 of the content application 106 indicating that the user wants to create and/or upload a new video to the server 102. If the user selects the button indicating that the user wants to create and/or upload a new video to the server 102, the voice recognition component 117 may be activated. If the voice recognition component 117 is activated, the voice recognition component 117 may begin listening for keywords in voice commands spoken by the user.

In embodiments, the voice recognition component 117 may initiate the performance of a corresponding action in response to hearing certain keywords in voice commands spoken by the user. For example, the video service 112 and/or the content application 106 may comprise a recording component 118. If the voice recognition component 117 recognizes a keyword associated with the initiation of recording of a video, the voice recognition component 117 may trigger the recording component 118 to begin the recording of the video. Examples of keywords associated with the initiation of recording of a video include, without limitation, "start," "action," "record," "go," etc. If the voice recognition component 117 recognizes a keyword associated with the pausing of recording of a video, the voice recognition component 117 may trigger the recording component 118 to pause (but not end) recording of the video. Examples of keywords associated with the pausing of recording of a video include, without limitation, "pause," "break," etc. If the voice recognition component 117 recognizes a keyword associated with the un-pausing of recording of a video, the voice recognition component 117 may trigger the recording component 118 to un-pause (e.g., restart) recording of the video. Examples of keywords associated with the un-pausing of recording of a video include, without limitation, "continue," "restart," "action," etc. If the voice recognition component 117 recognizes a keyword associated with the stopping of recording of a video, the voice recognition component 117 may trigger the recording component 118 to stop or end recording of the video. Examples of keywords associated with the stopping of recording of a video include, without limitation, "stop," "cut," "end," etc.

In embodiments, the recording component 118 may generate timestamps associated with the performing of the various actions. For example, if the recording component 118 initiates the recording of a video at time A, such as in response to being triggered by the voice recognition component 117, the recording component 118 may generate a timestamp associated with time A. As another example, if the recording component 118 pauses the recording of a video at time B, such as in response to being triggered by the voice recognition component 117, the recording component 118 may generate a timestamp associated with time B if the recording component 118 restarts the recording of a video at time C, such as in response to being triggered by the voice recognition component 117, the recording component 118 may generate a timestamp associated with time C. As yet another example, if the recording component 118 stops the recording of a video at time D, such as in response to being triggered by the voice recognition component 117, the recording component 118 may generate a timestamp associated with time D. The recording component 118 may store the timestamps as timestamp data 125 in a database 124. The timestamp data 125 may indicate, for each timestamp, the time associated with the timestamp and the corresponding action that was performed at that time.

In embodiments, the recording component 118 may store an unedited copy or version of the video recording, such as in a database 126 as unedited content 127. The unedited content 127 may be edited using the timestamp data 125. For example, the video service 112 and/or the content application 106 may comprise an editing component 119. The editing component 119 may be configured to edit the unedited content 127 using the timestamp data 125. For example, the editing component 119 may be configured to delete one or more segments from the unedited video based on the timestamp data 125. The one or more segments that are deleted may include one or more segments of the unedited video that feature a voice command. For example, the deleted segments may include those segments featuring the user speaking a "pause" or "stop" voice command. In this manner, the final, edited video will not feature the user speaking any voice commands. The final, edited video, may be stored as content 123 in the database 122 for distribution to the client devices 104*a-n*.

In embodiments, the voice recognition component 117 may initiate the performance of other corresponding actions in response to hearing other keywords in voice commands spoken by the user. For example, the voice recognition component 117 may be configured to initiate the performance of certain actions while a video is being recorded. If a user is able to utilize voice commands while recording a video, this may improve the quality of video being created. For example, utilize voice commands while recording a video makes accessible camera operations that would otherwise be inaccessible unless the user were to stop recording, walk up to the user device, and physically press buttons or touch screens.

For instance, if the voice recognition component 117 recognizes a keyword associated with zooming in or out during a video recording process, the voice recognition component 117 may trigger the camera operation component 210 to zoom in or out while recording the video. Examples of keywords associated with zooming in or out during a video recording include, without limitation, "zoom in," "zoom out," etc. If the voice recognition component 117 recognizes a keyword associated with focusing the camera during a video recording, the voice recognition component 117 may trigger the camera operation component 210 to focus (e.g., near field or far field). Examples of keywords associated with focusing the camera during a video recording include, without limitation, "focus," etc. If the voice recognition component 117 recognizes a keyword associated with adding or removing flash during a video recording, the voice recognition component 117 may trigger the camera operation component 210 to turn flash on or off. Examples of keywords associated with focusing the camera during a video recording include, without limitation, "flash on," "flash off," etc. If the voice recognition component 117 recognizes a keyword associated with using a wide lens or telephoto camera during a video recording, the voice recognition component 117 may trigger the camera operation component 210 to use a wide lens camera or telephoto camera. Examples of keywords associated with using a wide lens or telephoto camera during a video recording include, without limitation, "wide lens," "telephoto," etc. If the voice recognition component 117 recognizes a keyword associated with adding a filter or an effect during a video recording, the voice recognition component 117 may trigger the camera operation component 210 to add a filter or effect while recording the video. Examples of keywords associated with adding a filter or an effect during a video recording process include, without limitation, "add filter," "add effect," etc.

As another example, the voice recognition component 117 may be configured to search for certain content, such as one or more videos, in response to hearing one or more keywords indicative of content searching in voice commands spoken by the user. For example, the user may speak a command such as "search for videos of cats." The voice recognition component 117 may recognize one or more keywords in this command, and may, in response, present the search results for cat videos on the interface 108 of the client device 104.

Figure 2:
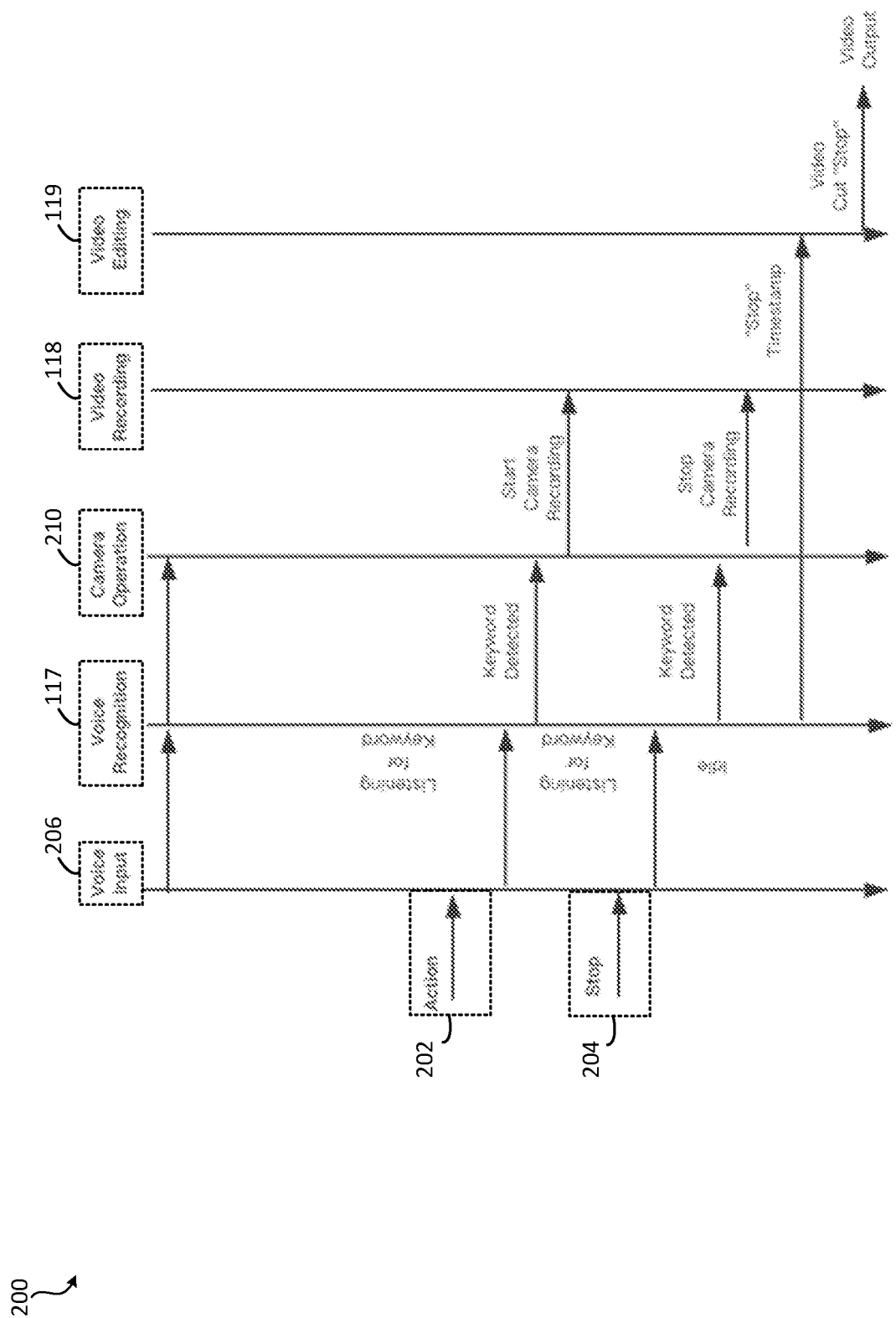
FIG. 2 shows an example diagram depicting a process for voice-controlled content creation which may be in accordance with the present disclosure.

FIG. 2 illustrates an example diagram 200 depicting a process for voice-controlled content creation which may be in accordance with the present disclosure. A user may indicate that the user wants to create content, such as a video. For example, a user may select a button on an interface 108 of the content application 106 indicating that the user wants to create and/or upload a new video to the server 102. If the user selects the button indicating that the user wants to create and/or upload a new video to the server 102, the voice recognition component 117 may be activated. If the voice recognition component 117 is activated, the voice recognition component 117 may begin listening for keywords in voice commands spoken by the user. For example, the voice recognition component 117 may listen for keywords captured by a voice input 206 of the client device 104. The voice input 206 may, for example, include one or more microphone inputs.

The voice recognition component 117 may, at a first time, recognize a first keyword 202 captured by the voice input 206. The first keyword 202 may be a keyword associated with the initiation of recording of a video. For example, the first keyword 202 may include "start," "action," "record," "go," etc. If the voice recognition component 117 recognizes the first keyword 202, the voice recognition component 117 may trigger the video recording component 118 to start a camera operation 210. The camera operation 210 may be, for example, the recording of the video.

The voice recognition component 117 may, at a second time occurring after the first time, recognize a second keyword 204 captured by the voice input 206. The second keyword 204 may be a keyword associated with the stopping of recording of the video. The second keyword 204 may be captured by the voice input 206, for example, during recording of the video. The second keyword 204 may include "stop," "cut," "end," etc. If the voice recognition component 117 recognizes the second keyword 204, the voice recognition component 117 may trigger the video recording component 118 to end a camera operation 210. The camera operation 210 may be, for example, the recording of the video.

The editing component 119 may be configured to edit the recording video, such as by using the timestamp data 125. For example, the editing component 119 may be configured to delete one or more segments from the unedited video based on the timestamp data 125. The one or more segments that are deleted may include one or more segments of the unedited video that feature a voice command. For example, the deleted segments may include the segment featuring the user speaking the second keyword 204. In this manner, the final, edited video will not feature the user speaking any voice commands. The final, edited video, may be stored as content 123 in the database 122 for distribution to the client devices 104*a-n*.

Figure 3:
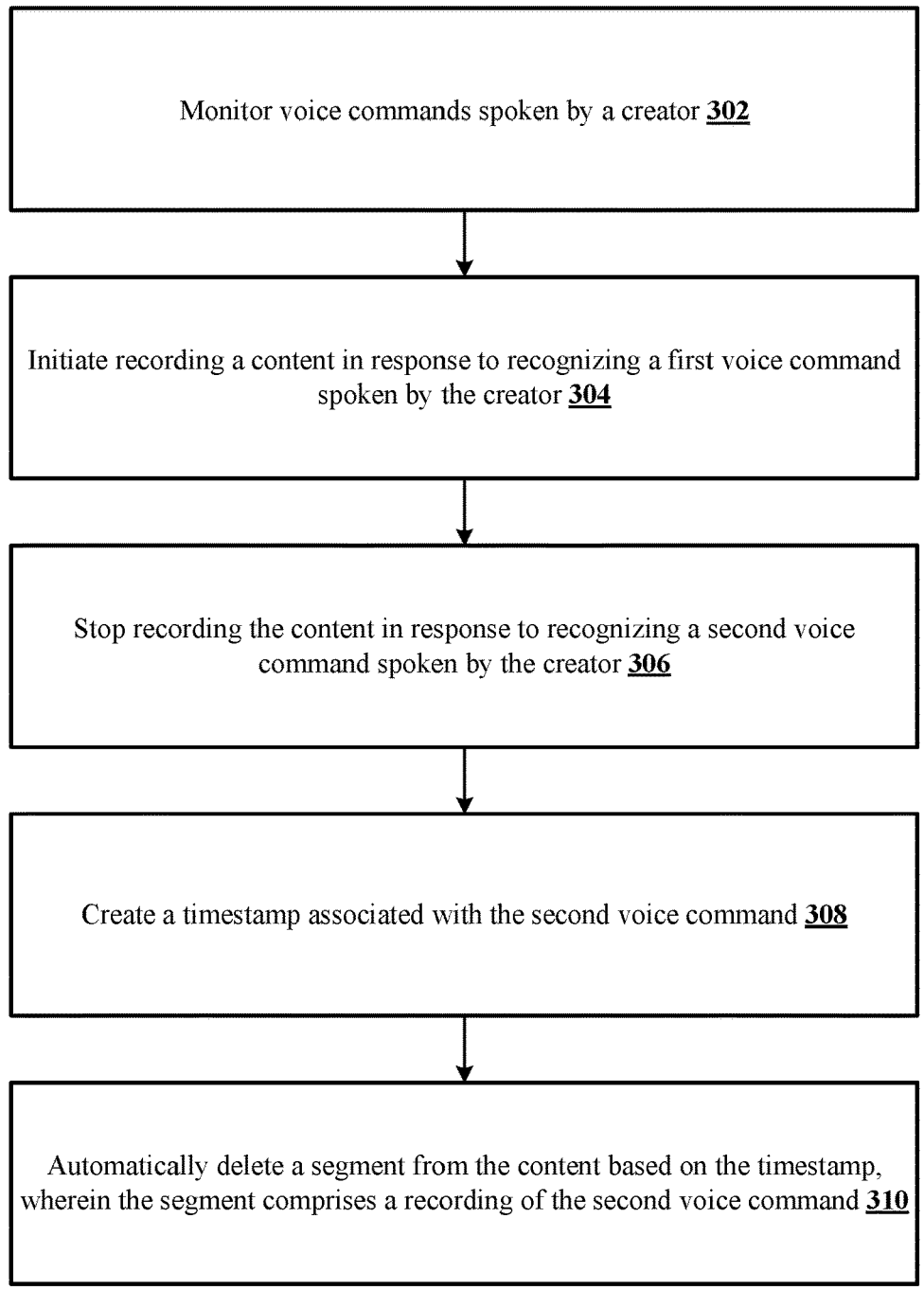
FIG. 3 shows an example method for voice-controlled content creation which may be in accordance with the present disclosure.

FIG. 3 illustrates an example process 300 for voice-controlled content creation. Although depicted as a sequence of operations in FIG. 3, those of ordinary skill in the art will appreciate that various embodiments may add, remove, reorder, or modify the depicted operations. At 302, voice commands spoken by a creator may be monitored. For example, a voice recognition component (i.e., voice recognition component 117) may be configured to listen for or monitor keywords associated with video creation. The voice commands may be captured, for example, by one or more microphones of a client device. The voice recognition component may be initiated (i.e., begin monitoring voice commands) in response to a user indicating that the user wants to create content, such as a video. For example, a user may select a button on an interface of the content application indicating that the user wants to create and/or upload a new video to the server. If the user selects the button indicating that the user wants to create and/or upload a new video to the server, the voice recognition component may be activated. If the voice recognition component is activated, the voice recognition component may begin listening for keywords in voice commands spoken by the user.

At 304, recording of a content may be initiated in response to recognizing a first voice command spoken by the creator. For example, the voice recognition component may initiate the recording of a video if the voice recognition component recognizes the first voice command. The first voice command may comprise a keyword associated with the initiation of recording of a video. Examples of keywords associated with the initiation of recording of a video include, without limitation, "start," "action," "record," "go," etc.

The content may continue to be recorded until the voice recognition component recognizes a second voice command. At 306, recording the content may be stopped in response to recognizing a second voice command spoken by the creator. For example, the voice recognition component may stop the recording of a video if the voice recognition component recognizes the second voice command. The second voice command may comprise a keyword associated with the stopping or termination of recording of a video. Examples of keywords associated with the stopping of recording of a video include, without limitation, "stop," "cut," "end," etc.

At 308, a timestamp associated with the second voice command may be created. For example, if the recording of the content is stopped at time C, such as in response to recognizing the second voice command, a timestamp associated with time C may be generated. The timestamp may be stored as timestamp data in a database. The timestamp data may indicate the time associated with the timestamp and the corresponding action that was performed at that time (i.e., recording was stopped).

The content may be edited using the timestamp data. At 310, a segment may be automatically deleted from the content based on the timestamp. The segment may comprise a recording of the second voice command. For example, an editing component (i.e., editing component 119) may be configured to automatically delete one or more segments from an unedited video based on the timestamp data. The one or more segments that are deleted may include one or more segments of the unedited video that feature a voice command, such as the second voice command. For example, the deleted segments may include those segments featuring the user speaking a "pause" or "stop" voice command. In this manner, the final, edited video will not feature the user speaking any voice commands.

Figure 4:
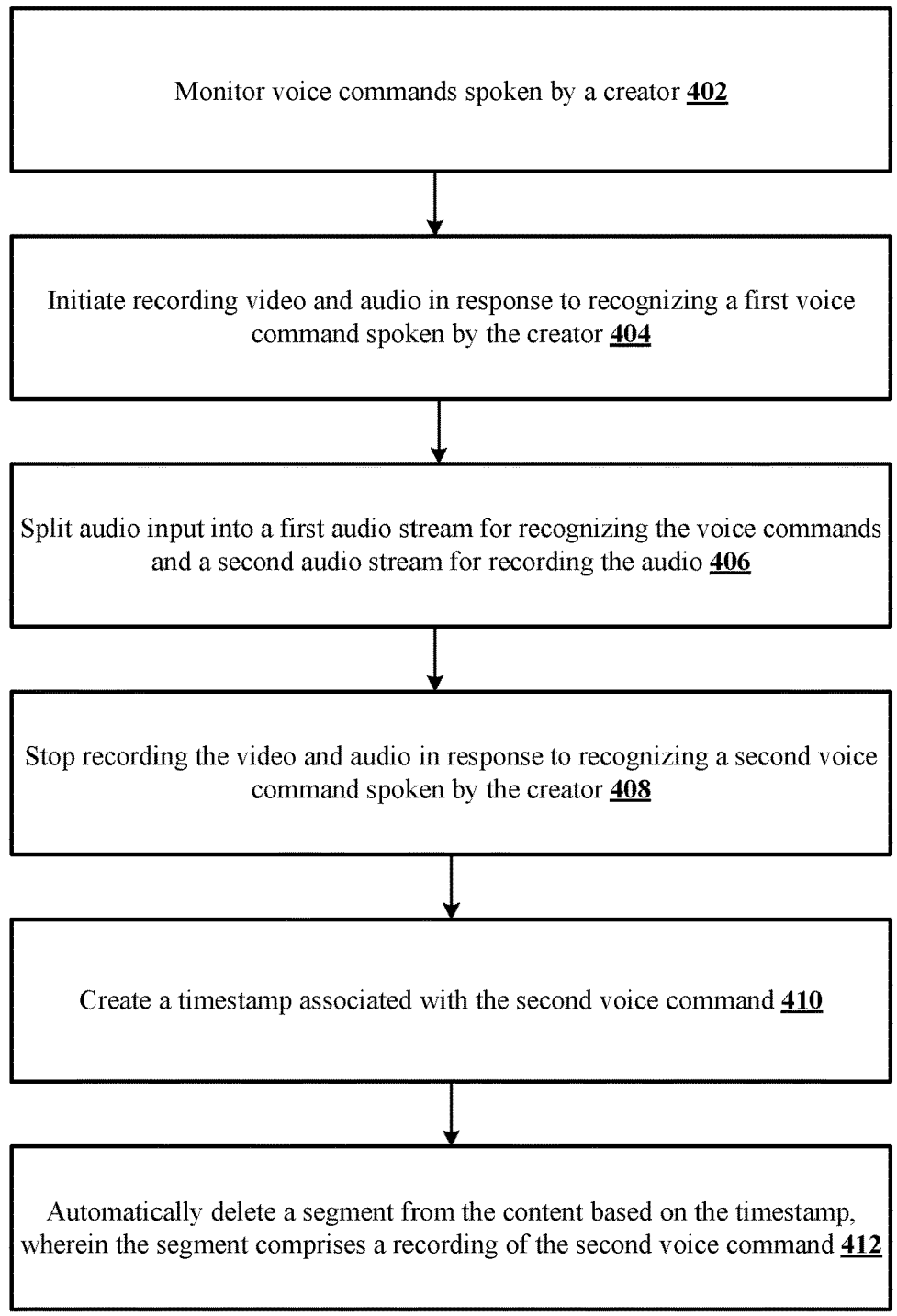
FIG. 4 shows an example method for voice-controlled content creation which may be in accordance with the present disclosure.

FIG. 4 illustrates an example process 400 for voice-controlled content creation. Although depicted as a sequence of operations in FIG. 4, those of ordinary skill in the art will appreciate that various embodiments may add, remove, reorder, or modify the depicted operations. At 402, voice commands spoken by a creator may be monitored. For example, a voice recognition component (i.e., voice recognition component 117) may be configured to listen for or monitor keywords associated with video creation. The voice commands may be captured, for example, by one or more microphones of a client device. The voice recognition component may be initiated (i.e., begin monitoring voice commands) in response to a user indicating that the user wants to create content, such as a video. For example, a user may select a button on an interface of the content application indicating that the user wants to create and/or upload a new video to the server. If the user selects the button indicating that the user wants to create and/or upload a new video to the server, the voice recognition component may be activated. If the voice recognition component is activated, the voice recognition component may begin listening for keywords in voice commands spoken by the user.

At 404, recording of a content may be initiated in response to recognizing a first voice command spoken by the creator. For example, the voice recognition component may initiate the recording of a video if the voice recognition component recognizes the first voice command. The first voice command may comprise a keyword associated with the initiation of recording of a video. Examples of keywords associated with the initiation of recording of a video include, without limitation, "start," "action," "record," "go," etc.

At 406, the audio input may be split into a first audio stream for recognizing the voice commands and a second audio stream for recording the audio. Splitting the audio input into a first stream for recognizing the voice commands and a second audio stream for recording the audio may make it easier to recognize the voice commands, such as a second voice command indicating that recording should be stopped.

The content may continue to be recorded until the voice recognition component recognizes a second voice command. At 408, recording the content may be stopped in response to recognizing a second voice command spoken by the creator. For example, the voice recognition component may stop the recording of a video if the voice recognition component recognizes the second voice command. The second voice command may comprise a keyword associated with the stopping or termination of recording of a video. Examples of keywords associated with the stopping of recording of a video include, without limitation, "stop," "cut," "end," etc.

At 410, a timestamp associated with the second voice command may be created. For example, if the recording of the content is stopped at time C, such as in response recognizing the second voice command, a timestamp associated with time C may be generated. The timestamp may be stored as timestamp data in a database. The timestamp data may indicate the time associated with the timestamp and the corresponding action that was performed at that time (i.e., recording was stopped).

The content may be edited using the timestamp data. At 412, a segment may be automatically deleted from the content based on the timestamp. The segment may comprise a recording of the second voice command. For example, an editing component (i.e., editing component 119) may be configured to delete one or more segments from an unedited video based on the timestamp data. The one or more segments that are deleted may include one or more segments of the unedited video that feature a voice command, such as the second voice command. For example, the deleted segments may include those segments featuring the user speaking a "pause" or "stop" voice command. In this manner, the final, edited video will not feature the user speaking any voice commands.

Figure 5:
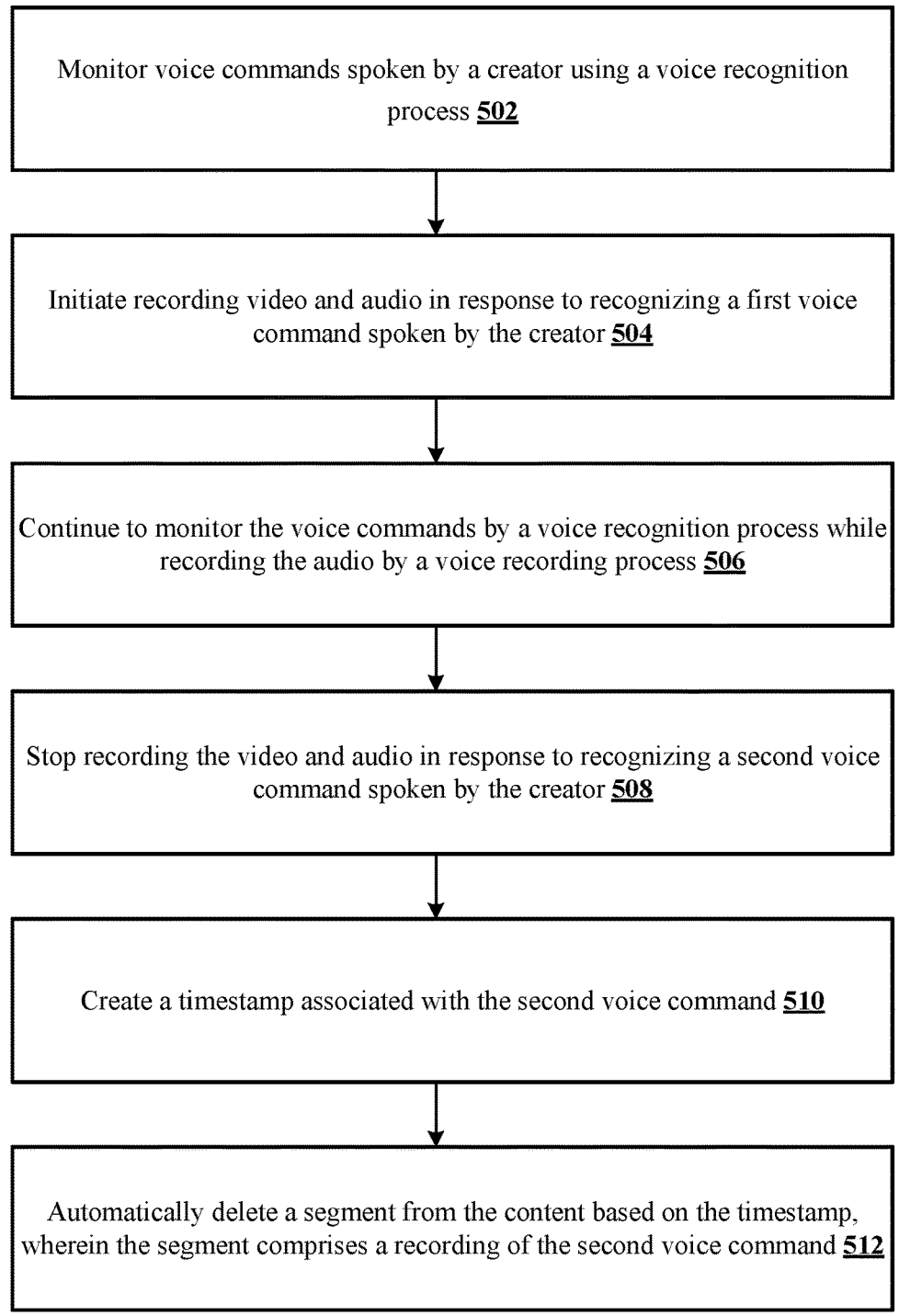
FIG. 5 shows an example method for voice-controlled content creation which may be in accordance with the present disclosure.

FIG. 5 illustrates an example process 500 for voice-controlled content creation. Although depicted as a sequence of operations in FIG. 5, those of ordinary skill in the art will appreciate that various embodiments may add, remove, reorder, or modify the depicted operations. At 502, voice commands spoken by a creator may be monitored using a voice recognition process (i.e., voice recognition component). For example, a voice recognition component (i.e., voice recognition component 117) may be configured to listen for or monitor keywords associated with video creation. The voice commands may be captured, for example, by one or more microphones of a client device. The voice recognition component may be initiated (i.e., begin monitoring voice commands) in response to a user indicating that the user wants to create content, such as a video. For example, a user may select a button on an interface of the content application indicating that the user wants to create and/or upload a new video to the server. If the user selects the button indicating that the user wants to create and/or upload a new video to the server, the voice recognition component may be activated. If the voice recognition component is activated, the voice recognition component may begin listening for keywords in voice commands spoken by the user.

At 504, recording of a content may be initiated in response to recognizing a first voice command spoken by the creator. For example, the voice recognition component may initiate the recording of a video if the voice recognition component recognizes the first voice command. The first voice command may comprise a keyword associated with the initiation of recording of a video. Examples of keywords associated with the initiation of recording of a video include, without limitation, "start," "action," "record," "go," etc.

At 506, the voice commands may be continued to be monitored by the voice recognition process while recording the audio by a voice recording process. The content, including video and/or audio, may continue to be recorded until the voice recognition component recognizes a second voice command. At 508, recording the content may be stopped in response to recognizing a second voice command spoken by the creator. For example, the voice recognition component may stop the recording of a video if the voice recognition component recognizes the second voice command. The second voice command may comprise a keyword associated with the stopping or termination of recording of a video. Examples of keywords associated with the stopping of recording of a video include, without limitation, "stop," "cut," "end," etc.

At 510, a timestamp associated with the second voice command may be created. For example, if the recording of the content is stopped at time C, such as in response recognizing the second voice command, a timestamp associated with time C may be generated. The timestamp may be stored as timestamp data in a database. The timestamp data may indicate the time associated with the timestamp and the corresponding action that was performed at that time (i.e., recording was stopped).

The content may be edited using the timestamp data. At 512, a segment may be automatically deleted from the content based on the timestamp. The segment may comprise a recording of the second voice command. For example, an editing component (i.e., editing component 119) may be configured to delete one or more segments from an unedited video based on the timestamp data. The one or more segments that are deleted may include one or more segments of the unedited video that feature a voice command, such as the second voice command. For example, the deleted segments may include those segments featuring the user speaking a "pause" or "stop" voice command. In this manner, the final, edited video will not feature the user speaking any voice commands.

Figure 6:
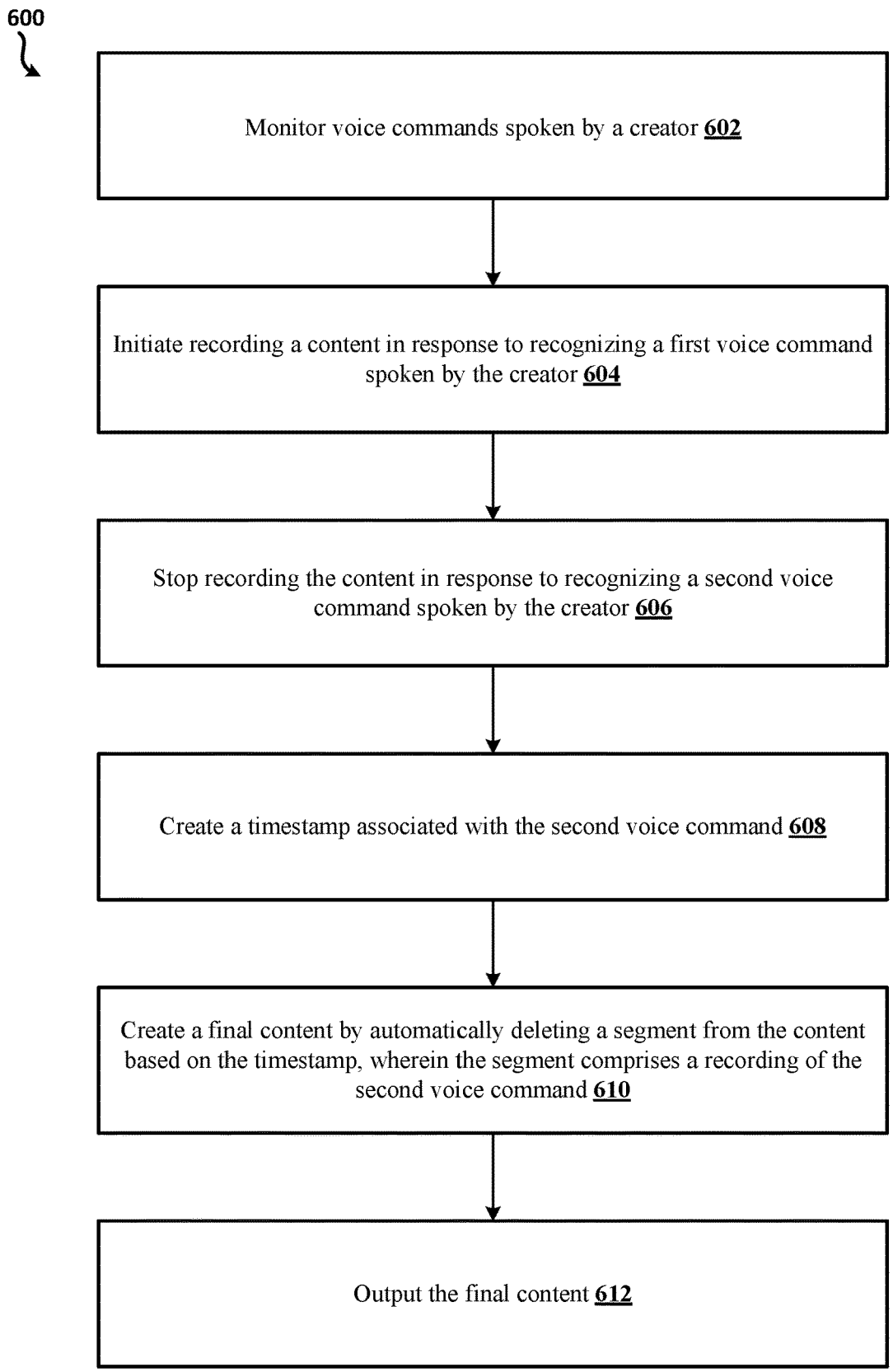
FIG. 6 shows an example method for voice-controlled content creation which may be in accordance with the present disclosure.

FIG. 6 illustrates an example process 600 for voice-controlled content creation. Although depicted as a sequence of operations in FIG. 6, those of ordinary skill in the art will appreciate that various embodiments may add, remove, reorder, or modify the depicted operations. At 602, voice commands spoken by a creator may be monitored. For example, a voice recognition component (i.e., voice recognition component 117) may be configured to listen for or monitor keywords associated with video creation. The voice commands may be captured, for example, by one or more microphones of a client device. The voice recognition component may be initiated (i.e., begin monitoring voice commands) in response to a user indicating that the user wants to create content, such as a video. For example, a user may select a button on an interface of the content application indicating that the user wants to create and/or upload a new video to the server. If the user selects the button indicating that the user wants to create and/or upload a new video to the server, the voice recognition component may be activated. If the voice recognition component is activated, the voice recognition component may begin listening for keywords in voice commands spoken by the user.

At 604, recording of a content may be initiated in response to recognizing a first voice command spoken by the creator. For example, the voice recognition component may initiate the recording of a video if the voice recognition component recognizes the first voice command. The first voice command may comprise a keyword associated with the initiation of recording of a video. Examples of keywords associated with the initiation of recording of a video include, without limitation, "start," "action," "record," "go," etc.

The content may continue to be recorded until the voice recognition component recognizes a second voice command. At 606, recording the content may be stopped in response to recognizing a second voice command spoken by the creator. For example, the voice recognition component may stop the recording of a video if the voice recognition component recognizes the second voice command. The second voice command may comprise a keyword associated with the stopping or termination of recording of a video. Examples of keywords associated with the stopping of recording of a video include, without limitation, "stop," "cut," "end," etc.

At 608, a timestamp associated with the second voice command may be created. For example, if the recording of the content is stopped at time C, such as in response recognizing the second voice command, a timestamp associated with time C may be generated. The timestamp may be stored as timestamp data in a database. The timestamp data may indicate the time associated with the timestamp and the corresponding action that was performed at that time (i.e., recording was stopped).

The content may be edited using the timestamp data. At 610, a final content may be created by automatically deleting a segment from the content based on the timestamp. The segment comprises a recording of the second voice command. For example, an editing component (i.e., editing component 119) may be configured to delete one or more segments from an unedited video based on the timestamp data. The one or more segments that are deleted may include one or more segments of the unedited video that feature a voice command, such as the second voice command. For example, the deleted segments may include those segments featuring the user speaking a "pause" or "stop" voice command. In this manner, the final, edited video will not feature the user speaking any voice commands. At 612, the final content may be output. For example, the final edited video may be uploaded to the video service and may be distributed to other users of the video service for consumption.

Figure 7:
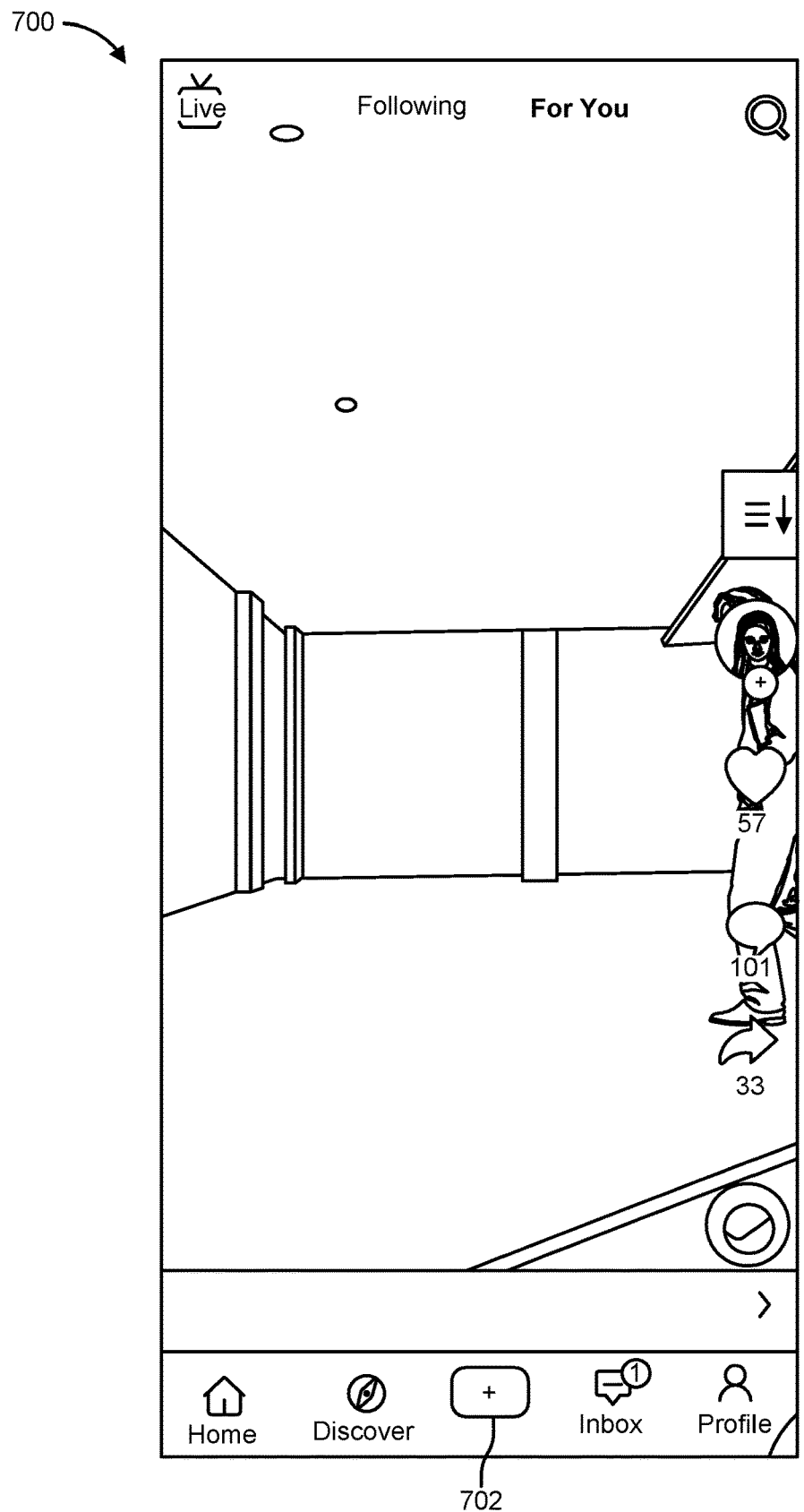
FIG. 7 shows an example user interface which may be in accordance with the present disclosure.
Figure 8:
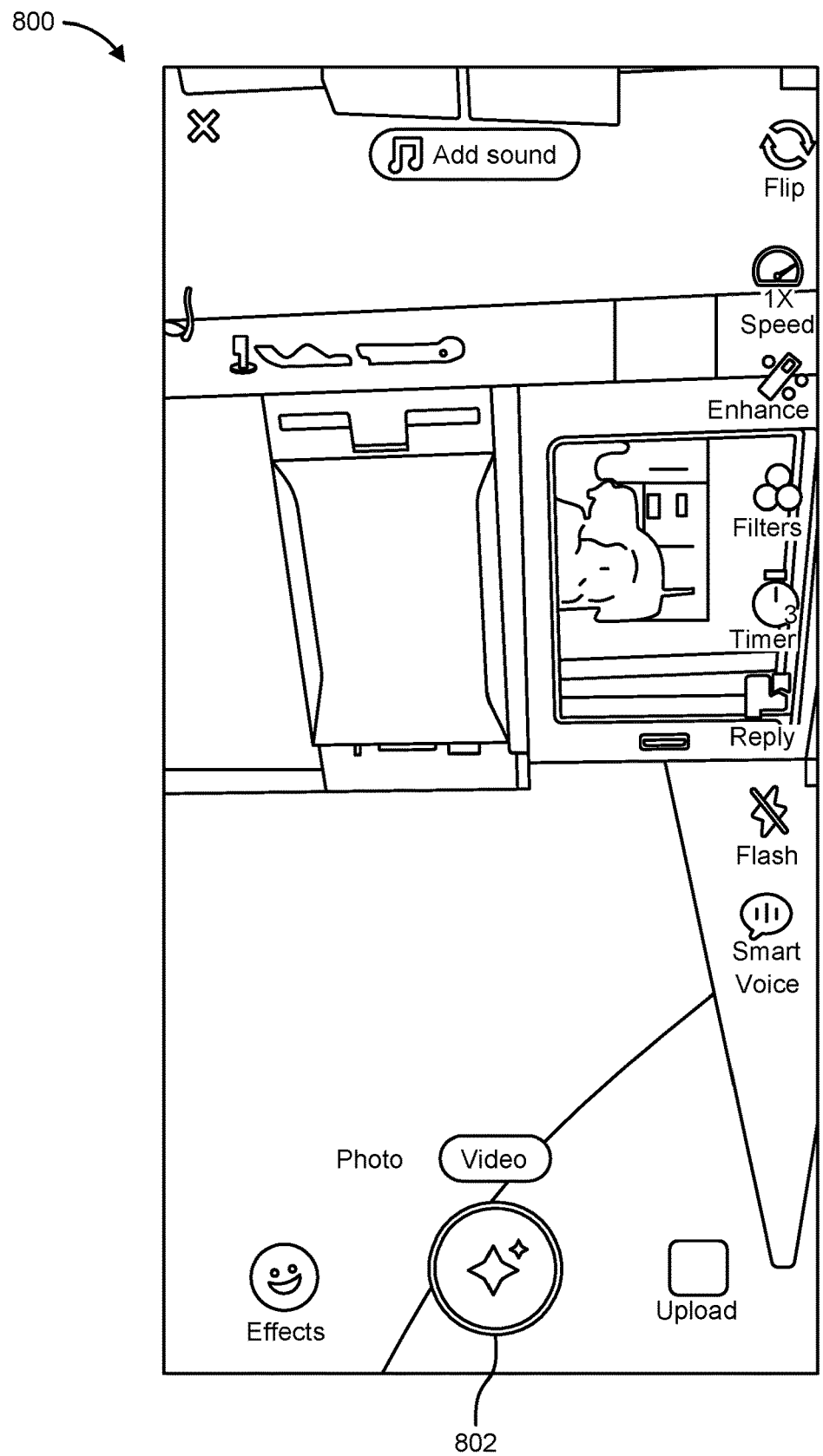
FIG. 8 shows another example user interface which may be in accordance with the present disclosure.

FIG. 7 shows an example UI 700 which may be in accordance with the present disclosure. A user may indicate that the user wants to create content, such as a video. For example, a user may select a button 702 on an interface of the content application indicating that the user wants to create and/or upload a new video to the server. If the user selects the button 702 indicating that the user wants to create and/or upload a new video to the server, a preview mode may optionally be initiated. FIG. 8 shows an example UI 800 which may be in accordance with the present disclosure. The UI 800 shows a camera feed in preview mode. In preview mode, the user may be able to see the background or scenery that will be present in the video. If the user does not like the background or scenery displayed in preview mode, the user can move the client device and/or point the camera at a different background or scenery. When the user is satisfied with the background or scenery, the user may want to begin shooting the video.

If the user wants to begin shooting the video, the user may want listening mode to be activated. If listening mode is activated, a voice recognition component may be activated. If a voice recognition component is activated, the voice recognition component may begin listening for keywords in voice commands spoken by the user. For example, the voice recognition component may listen for keywords captured by a voice input of the client device. The voice input may, for example, include one or more microphone inputs.

To initiate listening mode, the user may, for example, select a button 802. Alternatively, the client device may automatically enter listening mode when the user selects the button 702 indicating that the user wants to create and/or upload a new video to the server. For example, the client device may automatically enter listening mode when it is in preview mode.

Figure 9:
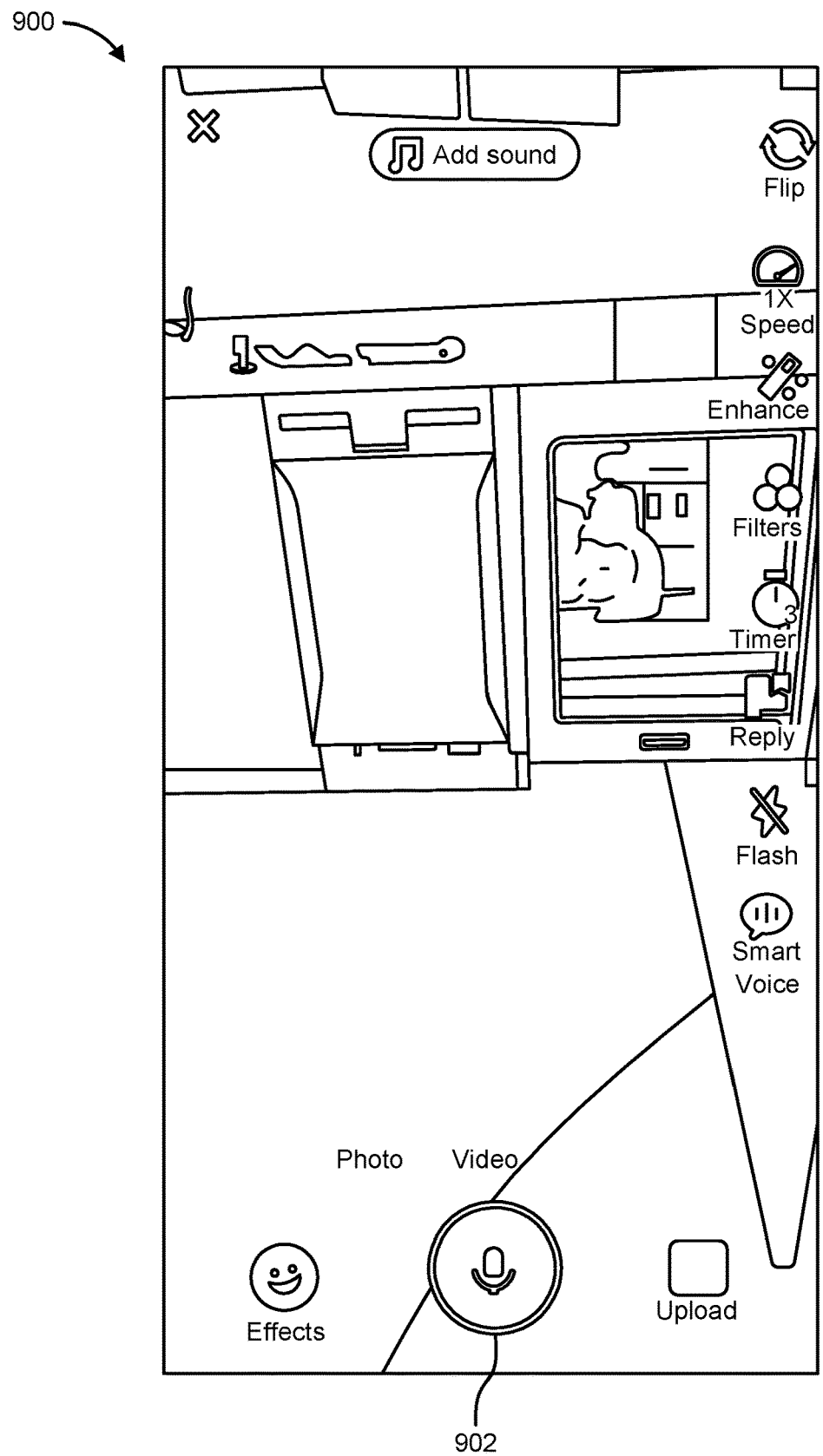
FIG. 9 shows another example user interface which may be in accordance with the present disclosure.
Figure 10:
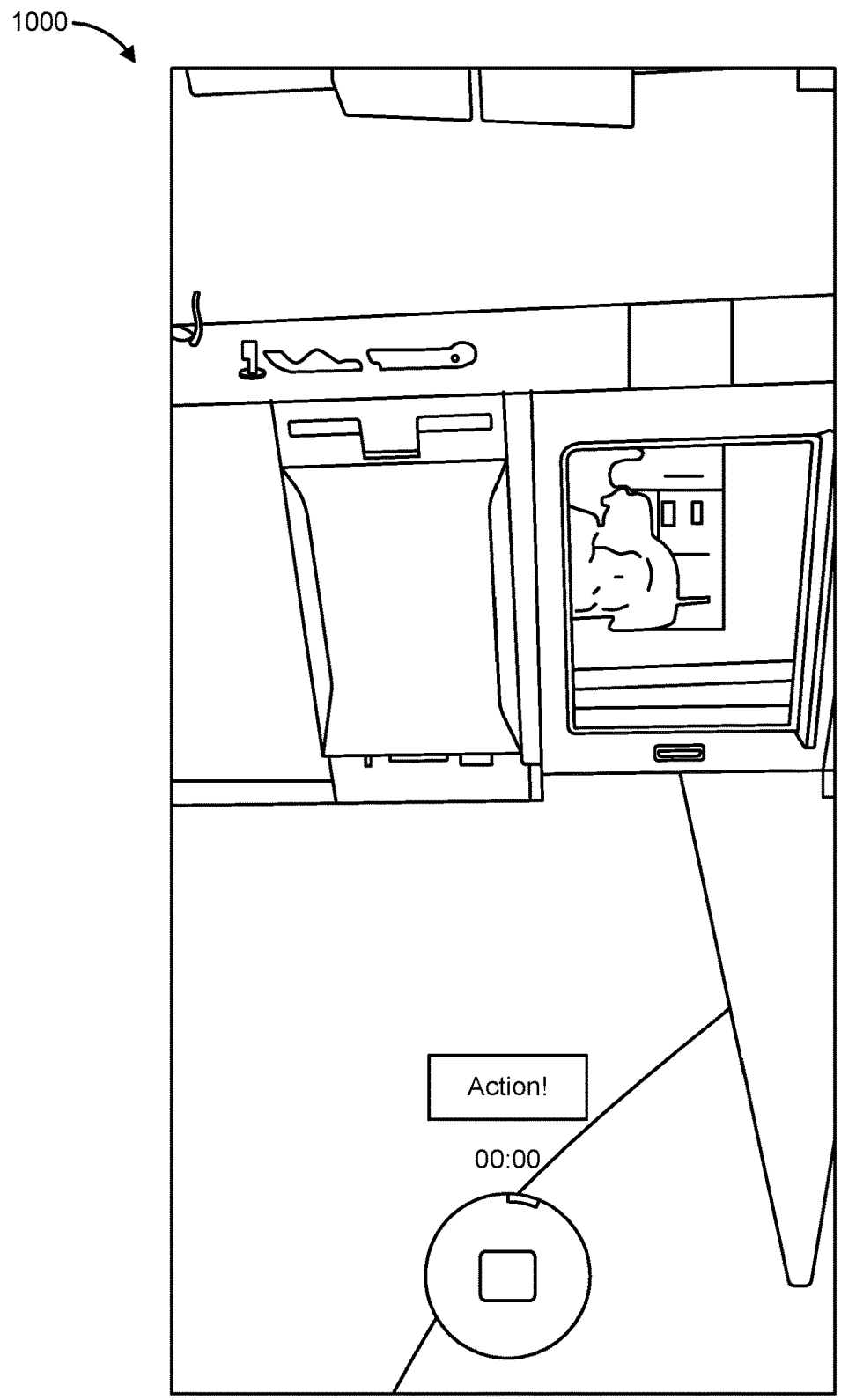
FIG. 10 shows another example user interface which may be in accordance with the present disclosure.

If the client device is in listening mode, an indication 902 of listening mode may appear on the UI 900, as shown by FIG. 9. The voice recognition component may, at a first time, recognize a first keyword captured by the voice input. The first keyword may be a keyword associated with the initiation of recording of a video. For example, the first keyword may include "start," "action," "record," "go," etc. If the voice recognition component recognizes the first keyword, the voice recognition component may initiate the recording of the video. For example, the client device may enter recording mode, as shown by the UI 1000 of FIG. 10. The client device may stay in recording mode (i.e., recording of the video may continue) until the voice recognition component, at a second time occurring after the first time, recognizes a second keyword captured by the voice input. The second keyword may be a keyword associated with the stopping of recording of the video. The second keyword may be captured by the voice input, for example, during recording of the video. The second keyword may include "stop," "cut," "end," etc. If the voice recognition component recognizes the second keyword, the voice recognition component may trigger the video recording component to end the recording of the video.

In some embodiments, a voice recognition component (e.g., the voice recognition component 117) may be configured to initiate the performance of certain actions during a content (e.g., video) editing process. If a user is able to utilize voice commands while editing a video, this may improve the editing process. For example, there may be many effects or filters that cannot all be displayed on a single screen due to limited screen space. As a result, users may have to scroll multiple times to search for a specific effect or filter. If the user can instead utilize voice commands to search for and/or apply a filter or effect during the editing process, the editing process may be more efficient.

Figure 11:
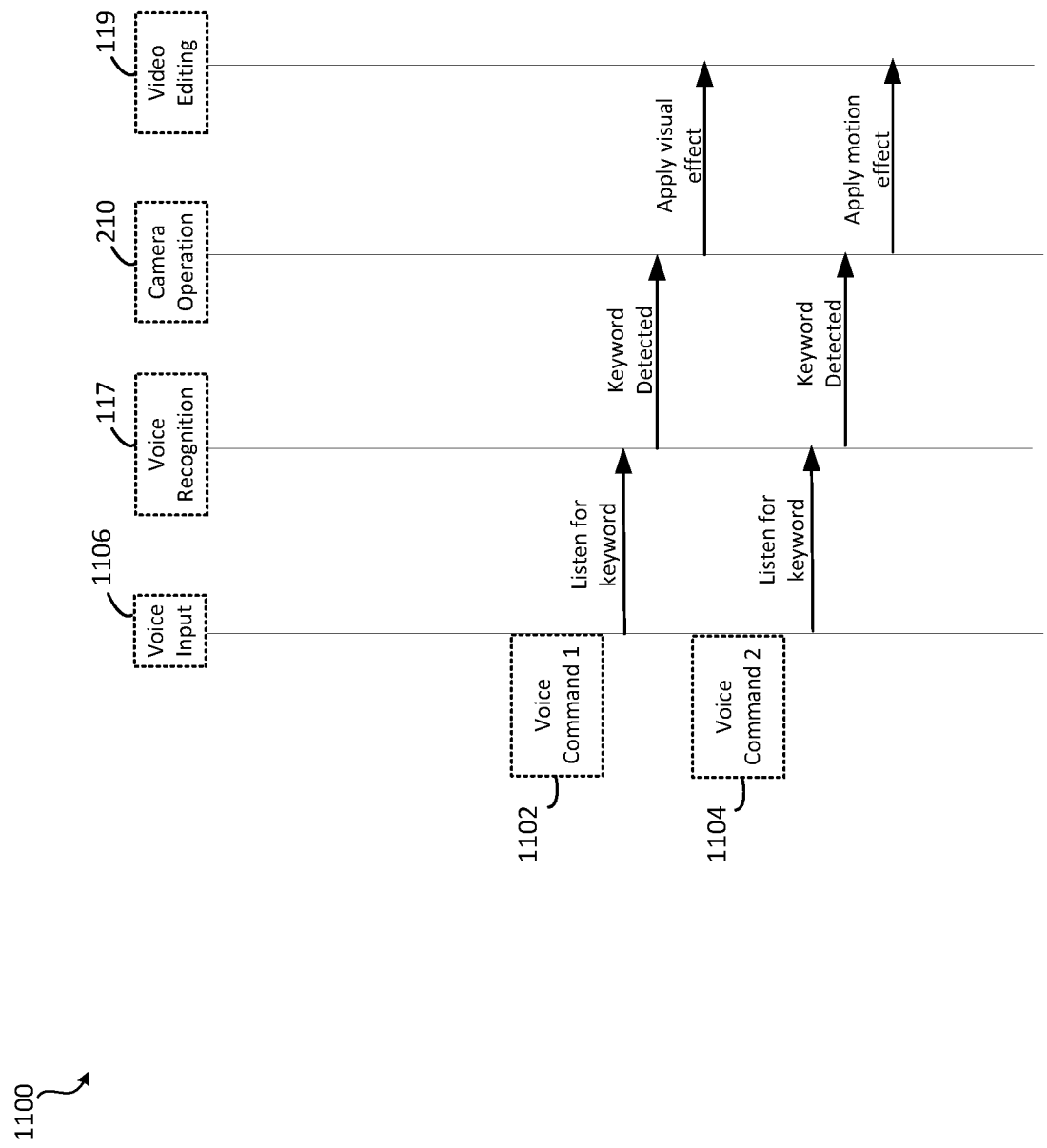
FIG. 11 shows an example diagram depicting a process for voice-controlled content creation which may be in accordance with the present disclosure.

FIG. 11 illustrates an example diagram 1100 depicting a process for voice-controlled video editing which may be in accordance with the present disclosure. A user may indicate that the user wants to edit a content (e.g., a video that has already been recorded) in any suitable manner. For example, a user may select a button on an interface 108 of the content application 106 indicating that the user wants to edit a video. If the user selects the button indicating that the user wants to edit a video, the voice recognition component 117 may be activated. If the voice recognition component 117 is activated, the voice recognition component 117 may begin listening for keywords in voice commands spoken by the user. For example, the voice recognition component 117 may listen for keywords captured by a voice input (e.g., the voice input 1106 of the client device 104). The voice input 1106 may, for example, include one or more microphone inputs.

Figure 12:
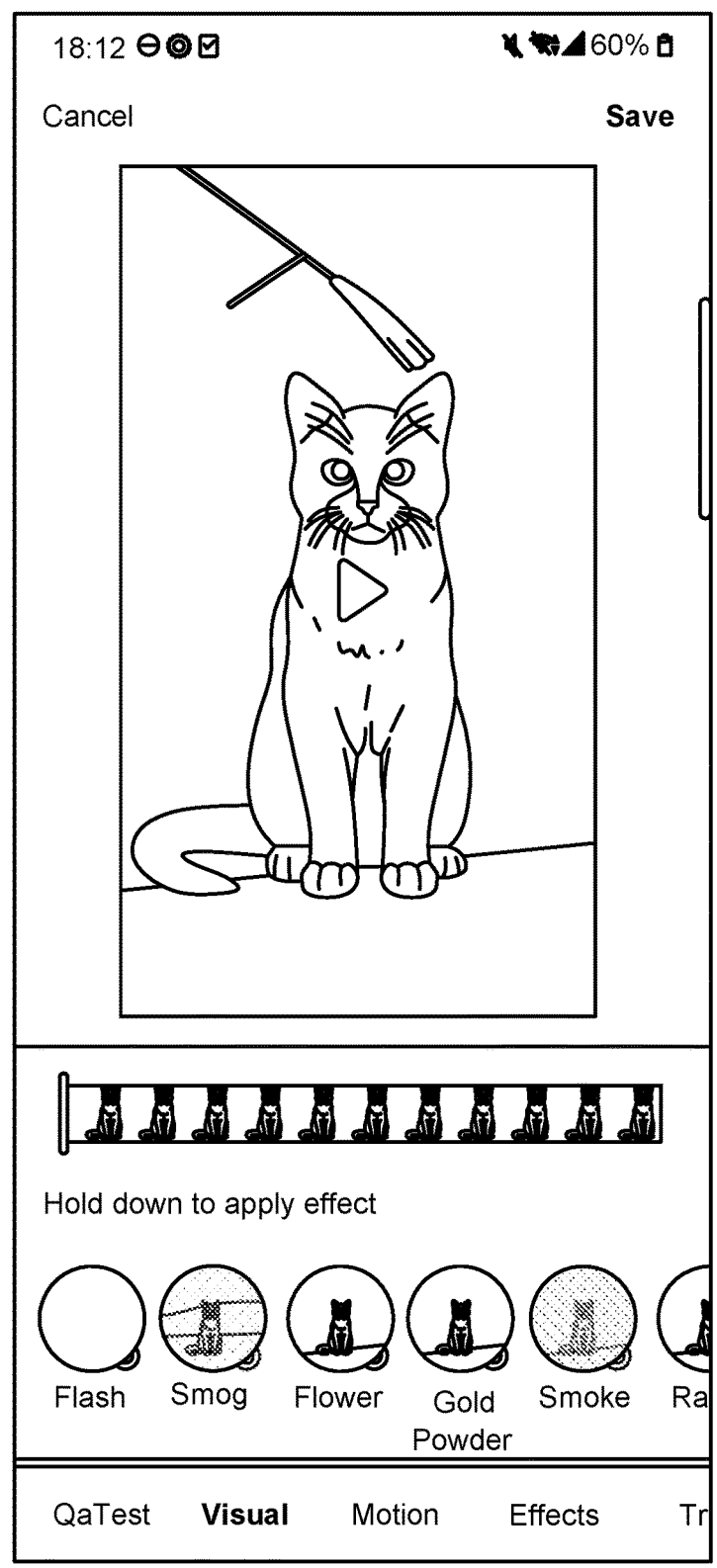
FIG. 12 shows another example user interface which may be in accordance with the present disclosure.

The voice recognition component 117 may, at a first time, recognize a first keyword 1102 captured by the voice input 1106. For example, the first keyword 1102 may be a keyword associated with adding a visual effect during the video editing process. If the voice recognition component 117 recognizes a first keyword 1102 associated with adding a visual effect during the video editing process, the video editing component 119 may be triggered to add the visual effect to the video. Examples of keywords associated with adding a visual effect during the video editing process include, without limitation, "add [visual effect name]," "apply [visual effect name]," etc. As shown in the UI 1200 of FIG. 12, the "visual effect name" may be the title of a visual effect, such as "flash," "smog," or "flower."

Figure 13:
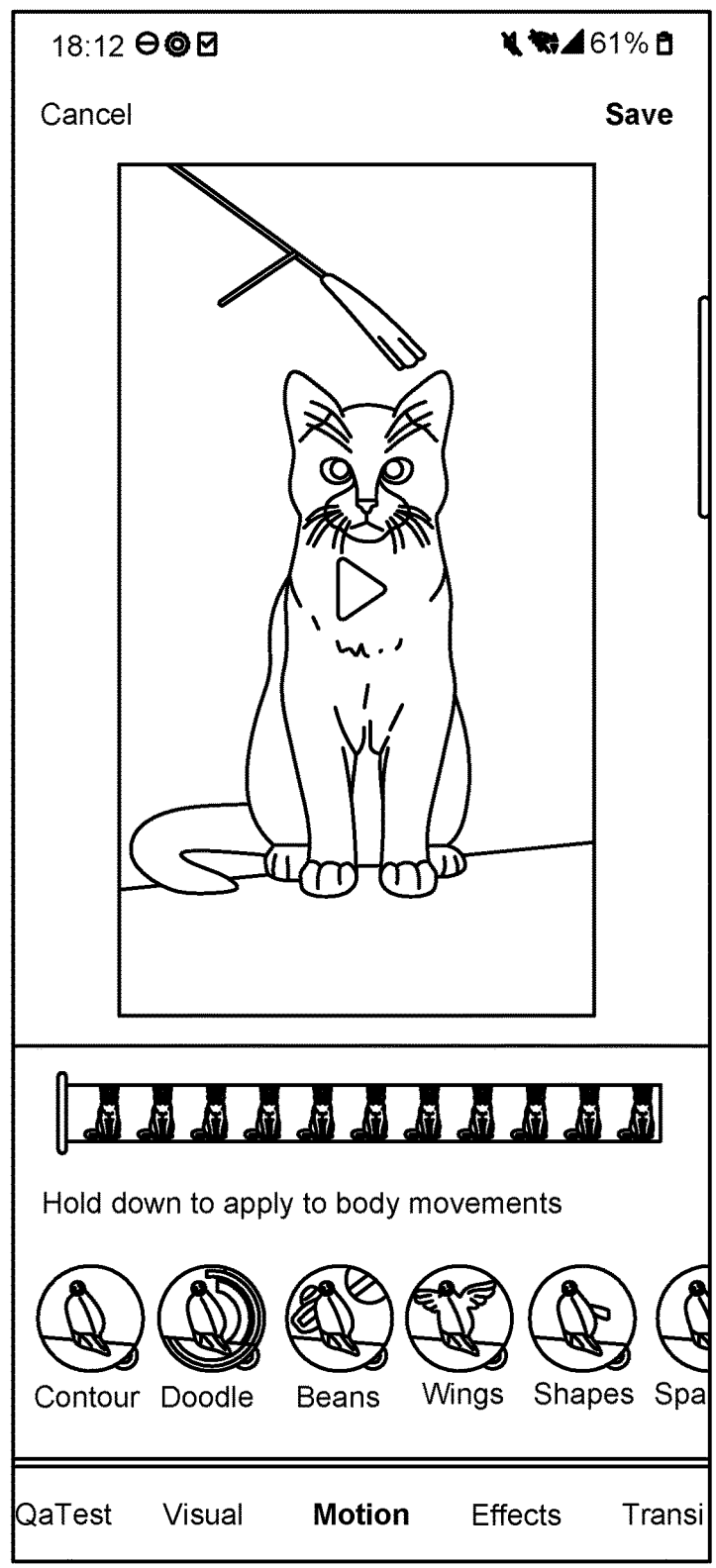
FIG. 13 shows another example user interface which may be in accordance with the present disclosure.

The voice recognition component 117 may, at a second time occurring after the first time, recognize a second keyword 1104 captured by the voice input 1106. The second keyword 1104 may be a keyword associated with adding a motion effect during the video editing process. If the voice recognition component 117 recognizes a second keyword 1104 associated with adding a motion effect during the video editing process, the video editing component 119 may be triggered to add the motion effect to the video. Examples of keywords associated with adding a motion effect during the video editing process include, without limitation, "add [motion effect name]," "apply [motion effect name]," etc. As shown in the UI 1300 of FIG. 13, the "motion effect name" may be the title of a motion effect, such as "wings," "counter," "beans," or "doodle."

Additionally, or alternatively, if the voice recognition component 117 recognizes a keyword associated with adding a filter during the video editing process, the voice recognition component 117 may trigger the video editing component 119 to add the filter to the video. Examples of keywords associated with adding a filter during the video editing process include, without limitation, "add [filter name]," "apply [filter name]," etc.

Figure 14:
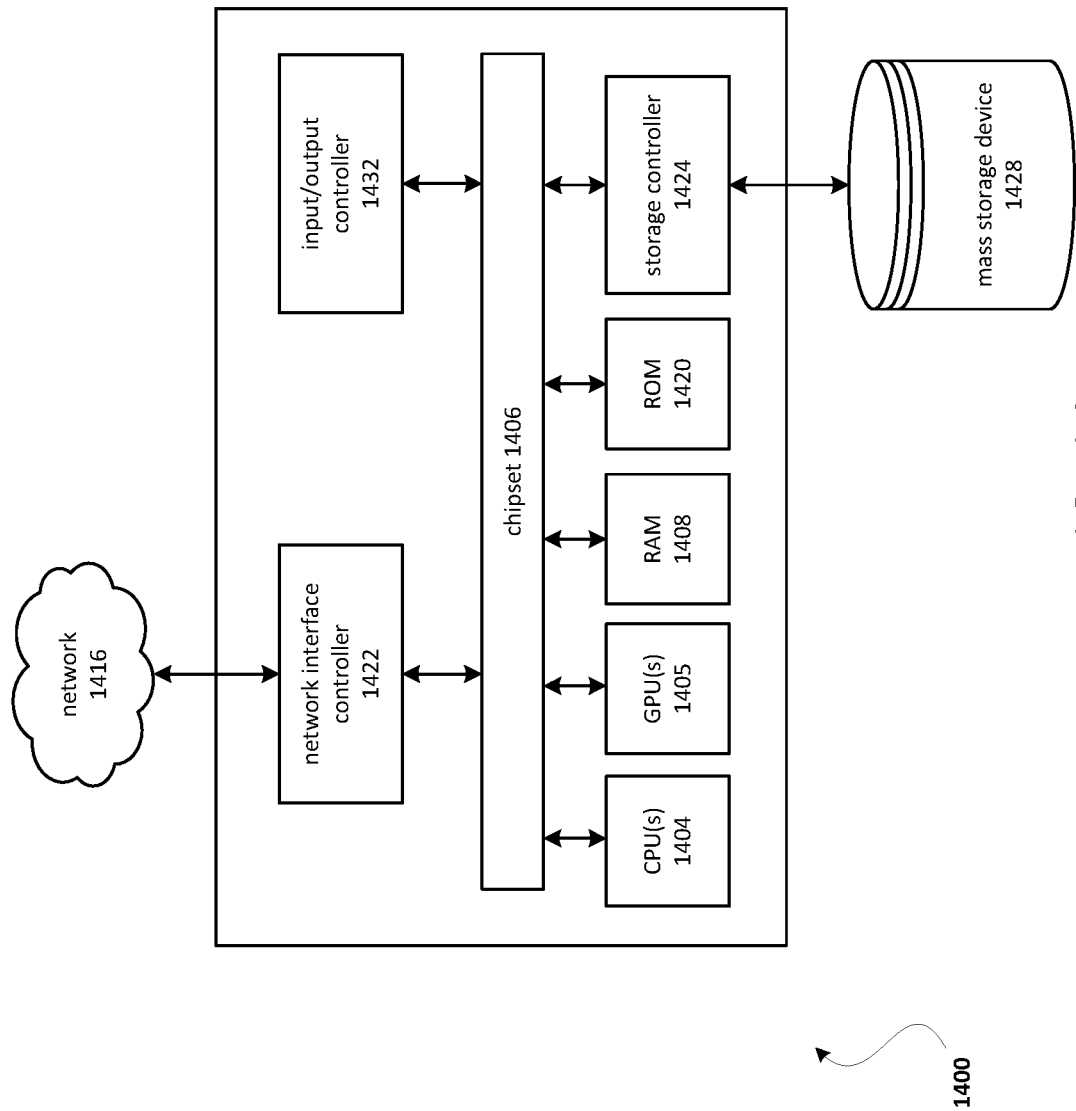
FIG. 14 shows an example computing device which may be used to perform any of the techniques disclosed herein.

FIG. 14 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s). The GPU(s) may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of voice-controlled content creation, comprising:
    causing to display an interface of a content application comprising a first interface element;
    initiating a preview mode and causing to display a second interface element in response to receiving a selection of the first interface element, wherein the selection of the first interface element indicates an intent to create a content;
    initiating a listening mode in response to receiving a selection of the second interface element, wherein the selection of the second interface element indicates a satisfaction of a background or scenery displayed in the preview mode, and wherein initiating the listening mode comprises activating a voice recognition process configured to listen for keywords captured by a voice input;
    causing to display a third interface element indicative of the listening mode instead of the second interface element at approximately the same location where the second interface element was displayed;
    monitoring voice commands spoken by a creator;
    initiating recording the content by a camera in response to recognizing a first voice command spoken by the creator;
    during recording the content, causing to control operations associated with the camera in response to recognizing a plurality of voice commands, wherein the operations comprise zooming the camera in or out, focusing the camera, and switching to another camera;
    during recording the content, causing to add at least one visual effect or aural effect into the content in response to recognizing a second voice command spoken by the creator;
    stopping recording the content in response to recognizing a third voice command spoken by the creator;
    creating a timestamp associated with the third voice command; and
    automatically deleting a segment from the content based on the timestamp, wherein the segment comprises a recording of the third voice command.

2. The method of claim 1, wherein the recording a content comprises recording video and audio.

3. The method of claim 2, further comprising:
    splitting audio input into a first audio stream for recognizing the voice commands and a second audio stream for recording the audio.

4. The method of claim 2, further comprising:
    monitoring the voice commands by the voice recognition process; and
    recording the audio by a voice recording process.

5. The method of claim 1, further comprising:
    creating a final content by automatically deleting the segment from the content; and
    outputting the final content.

6. The method of claim 1, wherein the voice commands further comprise a voice command indicative of searching videos associated with a particular topic.

7. The method of claim 1, wherein the voice commands further comprise a voice command indicative of editing the content in a particular manner during an editing process.

8. A system for voice-controlled content creation, comprising:
at least one computing device in communication with a computer memory, the computer memory comprising computer-readable instructions that upon execution by the at least one computing device, configure the system to perform operations comprising:
causing to display an interface of a content application comprising a first interface element;
initiating a preview mode and causing to display a second interface element in response to receiving a selection of the first interface element, wherein the selection of the first interface element indicates an intent to create a content;
initiating a listening mode in response to receiving a selection of the second interface element, wherein the selection of the second interface element indicates a satisfaction of a background or scenery displayed in the preview mode, and wherein initiating the listening mode comprises activating a voice recognition process configured to listen for keywords captured by a voice input;
causing to display a third interface element indicative of the listening mode instead of the second interface element at approximately the same location where the second interface element was displayed;
monitoring voice commands spoken by a creator;
initiating recording the content by a camera in response to recognizing a first voice command spoken by the creator;
during recording the content, causing to control operations associated with the camera in response to recognizing a plurality of voice commands, wherein the operations comprise zooming the camera in or out, focusing the camera, and switching to another camera;
during recording the content, causing to add at least one visual effect or aural effect into the content in response to recognizing a second voice command spoken by the creator;
stopping recording the content in response to recognizing a third voice command spoken by the creator;
creating a timestamp associated with the third voice command; and
automatically deleting a segment from the content based on the timestamp, wherein the segment comprises a recording of the third voice command.

9. The system of claim 8, wherein the recording a content comprises recording video and audio.

10. The system of claim 9, the operations further comprising:
splitting audio input into a first audio stream for recognizing the voice commands and a second audio stream for recording the audio.

11. The system of claim 9, the operations further comprising:
monitoring the voice commands by the voice recognition process; and
recording the audio by a voice recording process.

12. The system of claim 8, the operations further comprising:
creating a final content by automatically deleting the segment from the content; and
outputting the final content.

13. The system of claim 8, wherein the voice commands further comprise a voice command indicative of searching videos associated with a particular topic.

14. A non-transitory computer-readable storage medium, storing computer-readable instructions that upon execution by a processor cause the processor to implement operations comprising:
causing to display an interface of a content application comprising a first interface element;
initiating a preview mode and causing to display a second interface element in response to receiving a selection of the first interface element, wherein the selection of the first interface element indicates an intent to create a content;
initiating a listening mode in response to receiving a selection of the second interface element, wherein the selection of the second interface element indicates a satisfaction of a background or scenery displayed in the preview mode, and wherein initiating the listening mode comprises activating a voice recognition process configured to listen for keywords captured by a voice input;
causing to display a third interface element indicative of the listening mode instead of the second interface element at approximately the same location where the second interface element was displayed;
monitoring voice commands spoken by a creator;
initiating recording the content by a camera in response to recognizing a first voice command spoken by the creator;
during recording the content, causing to control operations associated with the camera in response to recognizing a plurality of voice commands, wherein the operations comprise zooming the camera in or out, focusing the camera, and switching to another camera;
during recording the content, causing to add at least one visual effect or aural effect into the content in response to recognizing a second voice command spoken by the creator;
stopping recording the content in response to recognizing a third voice command spoken by the creator;
creating a timestamp associated with the third voice command; and
automatically deleting a segment from the content based on the timestamp, wherein the segment comprises a recording of the third voice command.

15. The non-transitory computer-readable storage medium of claim 14, wherein the recording a content comprises recording video and audio.

16. The non-transitory computer-readable storage medium of claim 15, the operations further comprising:
splitting audio input into a first audio stream for recognizing the voice commands and a second audio stream for recording the audio.

17. The non-transitory computer-readable storage medium of claim 15, the operations further comprising:
monitoring the voice commands by the voice recognition process; and
recording the audio by a voice recording process.

18. The non-transitory computer-readable storage medium of claim 15, the operations further comprising:
creating a final content by automatically deleting the segment from the content; and
outputting the final content.

* * * * *